(12) United States Patent
Daroussin et al.

(10) Patent No.: US 11,378,242 B2
(45) Date of Patent: Jul. 5, 2022

(54) LIGHT DEVICE FOR A MOTOR VEHICLE, COMPRISING A MATRIX LIGHT SOURCE

(71) Applicant: VALEO VISION, Bobigny (FR)

(72) Inventors: Samuel Daroussin, Bobigny (FR); Zdravko Zojceski, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/290,897

(22) PCT Filed: Nov. 7, 2019

(86) PCT No.: PCT/EP2019/080604
§ 371 (c)(1),
(2) Date: May 3, 2021

(87) PCT Pub. No.: WO2020/094812
PCT Pub. Date: May 14, 2020

(65) Prior Publication Data
US 2021/0372583 A1    Dec. 2, 2021

(30) Foreign Application Priority Data
Nov. 9, 2018  (FR) ...................................... 18 60333

(51) Int. Cl.
*F21S 41/153*    (2018.01)
*F21V 23/00*    (2015.01)
(Continued)

(52) U.S. Cl.
CPC .......... *F21S 41/153* (2018.01); *F21V 23/004* (2013.01); *F21V 23/04* (2013.01); *H05B 45/48* (2020.01); *H05B 45/50* (2020.01)

(58) Field of Classification Search
CPC ...... F21V 23/04; F21V 23/004; H01L 27/156; H05B 45/48; H05B 45/50
See application file for complete search history.

(56) References Cited

U.S. PATENT DOCUMENTS 9,769,898 B1 *  9/2017  Buthker ................. H05B 45/10
9,840,186 B2 * 12/2017  Ichikawa ............... H05B 45/48
(Continued)

FOREIGN PATENT DOCUMENTS

| CN | 203504857 U | 3/2014 |
| JP | 2016-203863 A | 12/2016 |

OTHER PUBLICATIONS

English Machine Translation of JP 2016203863 provided by ESPACENET (Year: 2016).*
(Continued)

*Primary Examiner* — Zheng Song
(74) *Attorney, Agent, or Firm* — Oblon, McClelland, Maier & Neustadt, L.L.P.

(57) ABSTRACT

The invention relates to a light device for a motor vehicle, comprising a matrix light source having a matrix of elementary light sources with an electroluminescent semiconductor element. Each elementary light source has an emitting surface that is less than or equal to 0.2 mm2. The measures proposed by the invention allow such a matrix light source to be powered without any risk of damage due to overheating of the semiconductive junctions of the elementary light sources that make up the light source.

8 Claims, 1 Drawing Sheet

Figure 1:
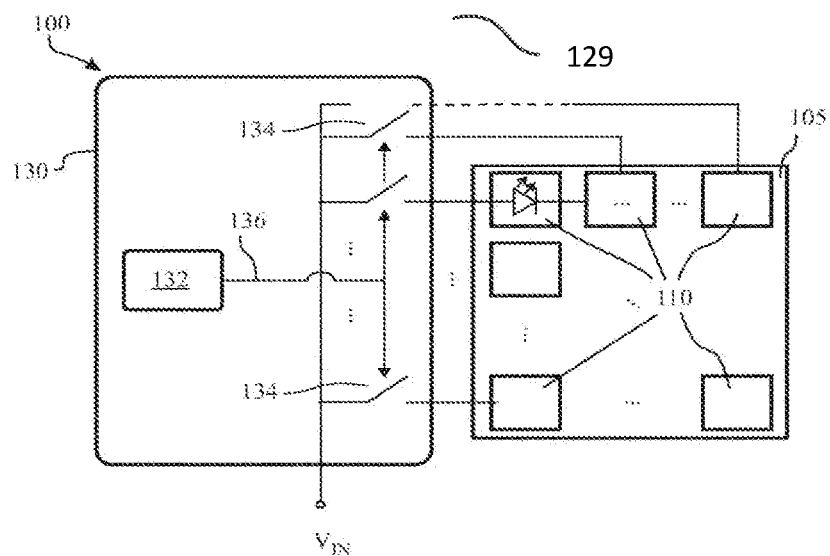

(51) Int. Cl.
   *F21V 23/04*   (2006.01)
   *H05B 45/48*   (2020.01)
   *H05B 45/50*   (2022.01)

(56) References Cited

U.S. PATENT DOCUMENTS

| | | | | |
|---|---|---|---|---|
| 9,974,135 | B1* | 5/2018 | Nelson | G01J 1/4204 |
| 2009/0009088 | A1* | 1/2009 | Ito | H05B 45/385 |
| | | | | 315/77 |
| 2012/0223875 | A1 | 9/2012 | Lau et al. | |
| 2012/0299476 | A1* | 11/2012 | Roberts | B60Q 1/2607 |
| | | | | 315/77 |
| 2014/0091993 | A1 | 4/2014 | Lau et al. | |
| 2015/0332635 | A1 | 11/2015 | Lau et al. | |
| 2018/0101084 | A1* | 4/2018 | Reinprecht | F21S 41/32 |
| 2019/0202344 | A1* | 7/2019 | Maruyama | H05B 45/48 |

OTHER PUBLICATIONS

International Search report dated Jan. 8, 2020 in PCT/EP2019/080604 filed Nov. 7, 2019, 2 pages.

* cited by examiner

LIGHT DEVICE FOR A MOTOR VEHICLE, COMPRISING A MATRIX LIGHT SOURCE

The invention relates to lighting devices for motor vehicles, involving electroluminescent semiconductor element-based matrix-array light sources. In particular, the invention relates to such a lighting device, the elementary light sources of which constituting the matrix-array light source have restricted emitting areas.

A light-emitting diode (LED) is a semiconductor electronic component capable of emitting light when an electric current flows therethrough. In the automotive field, LED technology is increasingly being used for numerous light signaling solutions. LEDs are used to provide lighting functions such as daytime running lights, signaling lights, etc. The light intensity emitted by an LED is generally dependent on the intensity of the electric current flowing therethrough. Inter alia, an LED is characterized by an electric current intensity threshold value. This maximum forward current generally decreases with increasing temperature. Likewise, when an LED emits light, a voltage drop equal to its forward voltage or nominal voltage is observed across its terminals. By driving the supply of electrical power to a light-emitting diode so as to vary the average intensity of the electric current flowing therethrough, it is possible to dim the light intensity of the LED. It is known practice to achieve this functionality by controlling an LED using a binary pulse-width-modulation (PWM) control signal. The operation of the LED is alternated periodically between a light-emitting state and an off state. The temperature of an LED increases during the emitting phase. For LEDs having an emitting area of one or more square millimeters, their thermal time constant is of the order of 20 milliseconds or more. That is to say that during an "emitting" phase of a PWM cycle at 200, 100 or 50 Hz, the temperature of the LED increases by less than 20° C., cooling down during the "off" phase which follows. Temperature variations of this order do not generally result in damage at its semiconductor junction.

The use of matrix arrays of LEDs comprising a high number of pixels or, equivalently, elementary electroluminescent light sources each having a submillimeter-sized restricted emitting area, is beneficial in numerous fields of application, and in particular also in the field of lighting and signaling for motor vehicles. A matrix array of LEDs may be used for example to create light beam forms that are beneficial for lighting functions, such as headlights or daytime running lights. In addition, a plurality of different lighting functions may be produced using a single matrix array, thus reducing the physical bulk in the restricted space of a motor vehicle headlight.

The emitting area of the elementary light sources is smaller than that of ordinarily known LEDs, by a factor of up to a hundred or more. The thermal time constant of the elementary light sources is therefore also smaller, and depending on the pixel manufacturing process used, this constant may be of the order of a millisecond. The use of control units for LEDs known in the prior art, able to generate PWM signals of the order of 200 Hz, is ill-suited to such a matrix array of pixels, since during an "emitting" cycle of the PWM signal the junction temperature of each elementary light source of the matrix array may increase by significantly more than 20° C., cooling down during the "off" cycle which follows. Temperature variations of this order run the risk of lasting damage to the semiconductor junctions of the elementary light sources, which end up failing.

One aim of the invention is to overcome at least one of the problems posed by the prior art. More precisely, the invention aims to provide a lighting device involving a matrix-array light source which allows a dimming of the light intensity emitted by each elementary light source that makes up its matrix array without resulting in failures due to overheating of their semiconductor junctions.

According to a first aspect of the invention, what is proposed is a lighting device for a motor vehicle. The device comprises a matrix-array light source having a matrix array of electroluminescent semiconductor element-based elementary light sources, and a circuit for managing the supply of electrical power to at least one group of elementary light sources, the circuit for managing the supply of electrical power comprising a control unit and, for each elementary light source of the group, a switch element for selectively connecting said elementary light source to an electricity source, the control unit being further intended to control the open state of the switch elements by means of a pulse-width-modulation binary control signal. The device is noteworthy in that the emitting area of each of the elementary light sources is smaller than or equal to $0.2\ mm^2$, and in that the control unit is able to transmit a control signal having a frequency higher than or equal to 300 Hz.

Preferably, the frequency of the control signal may be higher than or equal to 1 kHz.

Said group of elementary light sources may preferably comprise all of the elementary light sources of the matrix array of elementary light sources.

The circuit for managing the supply of electrical power may preferably be configured to control the open state of the switch elements of at least two groups of elementary light sources of the matrix array of elementary light sources in alternation.

Preferably, the two groups may be separate. Preferably, on a row of the matrix array of elementary light sources, elementary light sources of a first group may alternate with elementary light sources of a second group. Preferably, on a column of the matrix array of elementary light sources of the first group may alternate with elementary light sources of the second group.

The matrix-array light source may preferably comprise an integrated circuit in contact with the matrix array of light sources. The integrated circuit may preferably comprise at least a portion of the circuit for managing the supply of electrical power to the elementary light sources. These are for example said switch elements. The switch elements may preferably be field-effect transistors of MOSFET ("metal-oxide-semiconductor field-effect transistor") type.

The integrated circuit is intended to be in mechanical and electrical contact with a matrix array of elementary light sources of the matrix-array light source.

Preferably, the device may comprise means for attenuating acoustic frequencies. The attenuation means may for example comprise acoustically insulating materials known per se in the prior art in order to attenuate the transmission of acoustic frequencies to outside the device.

The integrated circuit may preferably include, for each of the elementary light sources of the matrix array of elementary light sources, a delay unit configured to delay, by a predetermined duration, the supply of power to the elementary source following reception of a command from the control signal.

Preferably, the delay unit of each elementary light source may be functionally connected to the delay unit of another elementary light source, the arrangement being such that the delay for the second elementary light source starts only to elapse once the delay of the first elementary light source has elapsed.

The delay for each elementary light source may preferably be identical.

Preferably, the delay unit may comprise a memory element for recording a delay value. The delay unit may preferably comprise a delay line.

Preferably, the delay lines associated with all of the elementary light sources may be clocked using the same clock signal.

The matrix array of elementary light sources may preferably comprise a common substrate supporting the elementary light sources. The common substrate of the matrix array may preferably comprise SiC.

Each light source may preferably be associated with its memory element and its circuit for managing the supply of electrical power, the memory elements and the managing circuits associated with different elementary light sources being independent of one another.

The integrated circuit may preferably comprise an Si substrate. The integrated circuit is preferably soldered or adhesively bonded to the matrix array of elementary light sources, for example to a common substrate supporting the elementary light sources. The integrated circuit is preferably soldered or adhesively bonded to the lower face of the common substrate, opposite the face that comprises the elementary light sources. The integrated circuit is preferably in mechanical contact, for example via fastening means, and in electrical contact with the common substrate, which has electrical connection areas on its lower face.

The pixelated light source, or equivalently, the matrix-array light source, may preferably comprise at least one matrix array of electroluminescent elements—the elementary light sources—also called a monolithic array, which elements are arranged in at least two columns by at least two rows. The electroluminescent source preferably comprises at least one monolithic matrix array of electroluminescent elements, also called a monolithic matrix array.

In a monolithic matrix array, the electroluminescent elements are grown from a common substrate and are electrically connected so as to be able to be activated selectively, individually or by subset of electroluminescent elements. Each electroluminescent element or group of electroluminescent elements may thus form one of the elementary emitters of said pixelated light source that may emit light when its or their material is supplied with electricity.

Various arrangements of electroluminescent elements may meet this definition of a monolithic matrix array, provided that the electroluminescent elements have one of their main dimensions of elongation substantially perpendicular to a common substrate and that the spacing between the elementary emitters, which are formed by one or more electroluminescent elements that are electrically grouped together, is small in comparison with the spacings found in known arrangements of flat square chips soldered to a printed circuit board.

The substrate may be made mainly of semiconductor material. The substrate may comprise one or more other materials, non-semiconductor for example. These electroluminescent elements, which are of submillimeter dimensions, are for example arranged so as to protrude from the substrate so as to form rods of hexagonal cross section. The electroluminescent rods originate on a first face of a substrate. Each electroluminescent rod, here formed using gallium nitride (GaN), extends perpendicular, or substantially perpendicular, to, and thereby protrudes from, the substrate, which here is made of silicon, though other materials, such as silicon carbide, may be used without departing from the context of the invention. By way of example, the electroluminescent rods could be produced from an alloy of aluminum nitride and of gallium nitride (AlGaN), or from an alloy of aluminum, indium and gallium phosphors (AlInGaP). Each electroluminescent rod extends along an axis of elongation defining its height, the base of each rod being arranged in a plane of the upper face of the substrate.

The electroluminescent rods of a given monolithic matrix array advantageously have the same shape and the same dimensions. They are each delimited by an end face and by a circumferential wall that extends along the axis of elongation of the rod. When the electroluminescent rods are doped and subjected to a bias, the resulting light output from the semiconductor source is mainly emitted from the circumferential wall, though it will be understood that light rays may also exit from the end face. As a result, each electroluminescent rod acts as a single light-emitting diode and the brightness of this source is improved, on the one hand because of the density of the electroluminescent rods present, and on the other hand because of the size of the illuminating area that is defined by the circumferential wall and that therefore extends over the entire perimeter and the entire height of the rod. The height of a rod may be between 2 and 10 µm, preferably 8 µm. The largest dimension of the end face of a rod is less than 2 µm, preferably less than or equal to 1 µm.

It will be understood that, when forming the electroluminescent rods, the height may be modified from one region of the pixelated light source to the next, so as to increase the brightness of the corresponding region when the average height of the rods therein is increased. Thus, a group of electroluminescent rods may have a height, or heights, that differ from another group of electroluminescent rods, these two groups being constituents of the same semiconductor light source comprising electroluminescent rods of submillimeter dimensions. The shape of the electroluminescent rods, and especially the shape of the cross section of the rods and the shape of the end face, may also vary from one monolithic matrix array to another. The rods have a generally cylindrical shape, and they may especially have a polygonal and more particularly hexagonal cross section. It will be understood that it is important, if light is to be able to be emitted through the circumferential wall, for the latter to have a polygonal or circular shape.

Moreover, the end face may have a shape that is substantially planar and perpendicular to the circumferential wall, such that it extends substantially parallel to the upper face of the substrate, or else it may have a shape that is curved or pointed at its center, so as to increase the directions in which the light exiting from this end face is emitted.

The electroluminescent rods may preferably be arranged in a two-dimensional matrix array. This arrangement could be such that the rods are staggered. Generally speaking, the rods are arranged at regular intervals on the substrate and the distance separating two immediately adjacent electroluminescent rods, in each of the dimensions of the matrix array, should be at least equal to 2 µm, preferably between 3 µm and 10 µm, such that the light emitted through the circumferential wall of each rod is able to exit from the matrix array of electroluminescent rods. Moreover, provision is made for these separating distances, measured between two axes of elongation of adjacent rods, not to be greater than 100 µm.

As an alternative, the monolithic matrix array may comprise electroluminescent elements formed by layers of epitaxial electroluminescent elements, in particular a first layer of n-doped GaN and a second layer of p-doped GaN, on a single substrate, for example made of silicon carbide, and which is sliced (by grinding and/or ablation) to form a plurality of elementary emitters respectively originating from one and the same substrate. The result of such a design is a plurality of electroluminescent blocks all originating from one and the same substrate and electrically connected so as to be able to be activated selectively from one another.

In one exemplary embodiment according to this other embodiment, the substrate of the monolithic matrix array may have a thickness of between 5 μm and 800 μm, in particular equal to 200 μm; each block may have a length and a width, each being between 50 μm and 500 μm, preferably between 100 μm and 200 μm. In one variant, the length and the width are equal. The height of each block is less than 500 μm, preferably less than 300 μm. Finally, the exit surface of each block may be formed via the substrate on the side opposite the epitaxy. The separating distance between two elementary emitters. The distance between each contiguous elementary emitter may be less than 1 mm, in particular less than 500 μm, and is preferably less than 200 μm.

As an alternative, both with electroluminescent rods extending respectively projecting from one and the same substrate, as described above, and with electroluminescent blocks obtained by slicing electroluminescent layers superimposed on one and the same substrate, the monolithic matrix array may furthermore comprise a layer of a polymer material in which the electroluminescent elements are at least partially embedded. The layer may thus extend over the entire extent of the substrate, or only around a given group of electroluminescent elements. The polymer material, which may in particular be silicone-based, creates a protective layer that allows the electroluminescent elements to be protected without hindering the diffusion of the light rays. Furthermore, it is possible to integrate, into this layer of polymer material, wavelength conversion means, for example luminophores, that are able to absorb at least some of the rays emitted by one of the elements and to convert at least some of said absorbed excitation light into an emission light having a wavelength that is different from that of the excitation light. Provision may be made without distinction for the luminophores to be embedded in the mass of the polymer material, or else to be arranged on the surface of the layer of this polymer material.

The pixelated light source may furthermore comprise a coating of reflective material to deflect the light rays to the exit surfaces of the light source.

The electroluminescent elements of submillimeter dimensions define a given exit surface in a plane substantially parallel to the substrate. It will be understood that the shape of this exit surface is defined depending on the number and the arrangement of the electroluminescent elements that form it. It is thus possible to define a substantially rectangular shape of the emission surface, it being understood that the latter may vary and adopt any shape without departing from the context of the invention.

By using the measures proposed by the present invention, it becomes possible to provide a lighting device for a motor vehicle, in which the elementary semiconductor light sources of a matrix-array or pixelated light source may be controlled by a pulse-width-modulation (PWM)-type signal without risk of damage to the semiconductor junctions of the elementary light sources. By adopting a high PWM frequency, in particular 300 Hz or more, and preferably at least 1 kHz, the elementary light sources having an emitting area of less than 2 mm$^2$ are not at risk of heating up by more than 20° C. during an "emitting" phase of the control signal. According to some aspects of the invention, a plurality of groups of elementary light sources of the pixelated matrix array are controlled by a PWM-type signal in a time-shifted manner. This makes it possible to further reduce the increase in temperature at the semiconductor junctions. Specifically, since the elementary light sources are small and spatially very close to one another, the heating of each source subsequent to it being supplied with power may potentially contribute to the heating of neighboring sources and vice versa. By limiting the number of neighboring elementary light sources supplied with power at a given time, this mutual heating contribution may be at least partially mitigated. The matrix-array light source according to some aspects of the invention may in particular comprise an integrated circuit that houses, potentially for each elementary light source, a memory element for recording therein a value that corresponds to a brightness setpoint, and a circuit for managing the supply of electrical power to the elementary light source. The circuit for managing the supply of electrical power adapts the average intensity of the electric current, for example by way of a pulse-width-modulation (PWM)-type control signal for the elementary light source in question. The light intensity emitted by each pixel is thus dimmed by the matrix-array source itself. The brightness setpoint is the only external command that the circuit for managing the supply of electrical power to the elementary light source needs to control the elementary source. Since the measures of the invention contribute to mitigating the overheating of the semiconductor junctions of a pixelated matrix array of light-emitting diodes, the invention makes it possible to increase the lifetime of these components, the manufacture of which is expensive and technically difficult.

Figure 2:
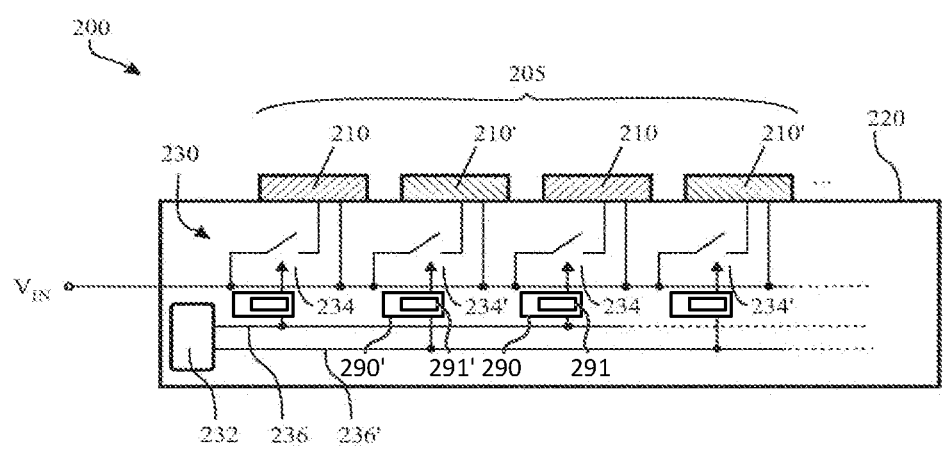

Other features and advantages of the present invention will be better understood with the aid of the description of the examples and of the drawings, in which:

FIG. 1 schematically shows a lighting device according to one preferred embodiment of the invention;

FIG. 2 schematically shows a section through a lighting device according to one preferred embodiment of the invention.

Unless specified otherwise, technical features that are described in detail for one given embodiment may be combined with the technical features that are described in the context of other embodiments described by way of example and without limitation. Similar reference numerals will be used to describe similar concepts across various embodiments of the invention. For example, the references 100 and 200 denote two embodiments of a lighting device according to the invention.

The description focuses on the elements of a lighting device for a motor vehicle which are necessary for an understanding of the invention. Other elements, which in a known manner form part of such devices, will not be mentioned or described in detail. It goes without saying, for example, that a lighting device comprises structural elements for the installation of the described components, or, for example, a heat dissipation element such as a radiator.

The illustration in FIG. 1 shows a lighting device 100 comprising a pixelated or matrix-array light source 105 according to one preferred embodiment of the invention. The matrix-array light source 105 comprises a plurality of electroluminescent semiconductor element-based elementary light sources 110 and a common substrate, not illustrated. Each elementary light source comprises an emitting area extending over 0.14×0.14 mm, or less. When an elementary light source of this size is traversed by an electric current with an intensity higher than or equal to the intensity of the forward current, it experiences a temperature gradient of the order of 20° C. after a few milliseconds, even one millisecond.

The matrix-array light source 105 preferably comprises a monolithic matrix-array component, in which the semiconductor layers of the elementary light sources 110 are, for example, arranged on the common substrate. The matrix array of elementary light sources 110 preferably comprises a parallel assembly of a plurality of branches, each branch comprising electroluminescent semiconductor light sources 110.

The device 100 comprises a circuit for managing the supply of electrical power 130 to a group of elementary light sources. In the example of FIG. 1, this group comprises all of the light sources of the matrix array 105, without, however, the invention being limited to this embodiment. The managing circuit comprises, for each elementary light source, a switch device which is controlled by means of a control signal 136 so as to take an open state or a closed state. The arrangement is such that, when the switch is in the closed state, the corresponding elementary light source is connected to an electricity source, while in the open state, the elementary light source is not connected thereto. Other arrangements are conceivable for controlling the light-emitting/off state of an elementary light source, without, however, departing from the scope of the present invention.

The electricity source may for example comprise a converter circuit configured to transform an input electric current/voltage, delivered for example by a source internal to the motor vehicle, such as a battery, into a load current/voltage, with an intensity/value suitable for supplying the matrix array 105 with electrical power.

A control unit 132 generates the control signal 136. The signal has a binary appearance, corresponding to the two distinct states that the switch elements 134 may take. It is a pulse-width-modulation (PWM) signal, the frequency of which is higher than or equal to 300 Hz, and preferably higher than or equal to 1 kHz. At this frequency, the phase during which a switch 134 is closed and during which the corresponding elementary light source 110 emits light and heats up is short enough that its semiconductor junction does not heat up by more than 20° C. This prevents damage to the junction. The heating phase, which is equivalent to the duration for which an elementary light source is supplied with power continuously, does not exceed the thermal time constant of said elementary light source. Electronic circuits able to generate PWM signals as just described are known per se and their arrangement and operation will not be described in greater detail in the context of this invention.

When the matrix-array light source is voltage-driven, the driving of each elementary source, or equivalently, of each pixel, merely entails controlling a switch device 134 as shown schematically in FIG. 1. By controlling the state of the device 134, the elementary light source 110 may be selectively connected to the voltage source Vin. The switch device is for example formed by a field-effect transistor of MOSFET type, preferably characterized by a low voltage drop between its drain and source terminals, and controlled by a control signal 136 from the circuit for managing the supply of power 132. The control signal 136 is a pulse-width-modulation (PWM) signal. This is a cyclic binary signal. The choice of the duty cycle, that is to say the respective duration of the non-zero phase and of the zero phase of the cycle, directly influences the average value of the signal, which is between the extreme values of the signal. The cyclic signal 136 forms a sequence of binary commands for opening/closing the switch device 134. The average intensity of the electric current flowing through the elementary light source 110, and therefore the average light intensity emitted by this elementary light source, reflects the average value of the PWM control signal 136.

By way of example and without limitation, the matrix array of elementary light sources 105 comprises, along the thickness of the substrate and starting at the end opposite the location of the elementary sources 110, a first electrically conductive layer deposited on an electrically insulating substrate. This is followed by an n-doped semiconductor layer whose thickness is between 0.1 and 2 µm. This thickness is much smaller than that of known light-emitting diodes, for which the corresponding layer has a thickness of the order of 1 to 2 µm. The following layer is the active quantum well layer having a thickness of around 30 nm, followed by an electron-blocking layer, and finally a p-doped semiconductor layer, the latter having a thickness of around 300 nm. Preferably, the first layer is an (Al)GaN:Si layer, the second layer is an n-GaN:Si layer, and the active layer comprises quantum wells made of InGaN alternating with barriers made of GaN. The blocking layer is preferably made of AlGaN:Mg and the p-doped layer is preferably made of p-GaN:Mg. n-Doped gallium nitride has a resistivity of 0.0005 ohm/cm, whereas p-doped gallium nitride has a resistivity of 1 ohm/cm. The thicknesses of the proposed layers make it possible in particular to increase the internal series resistance of the elementary source, while at the same time significantly reducing its manufacturing time, as the n-doped layer is not as thick in comparison with known LEDs and requires a shorter deposition time. By way of example, a time of 5 hours is typically required for MOCVD depositions for a standard-configuration LED with 2µ of n layer, and this time may be reduced by 50% if the thickness of the n layer is reduced to 0.2µ.

In order to achieve elementary light sources 110 having semiconductor layers having homogeneous thicknesses, the monolithic component 105 is preferably manufactured by depositing the layers homogeneously and uniformly over at least part of the surface of the substrate so as to cover it. The layers are deposited for example using a metal oxide chemical vapor deposition (MOCVD) method.

Such methods and reactors for implementing them are known for depositing semiconductor layers on a substrate, for example from patent documents WO 2010/072380 A1 or WO 01/46498 A1. Details on their implementation will therefore not be described in the context of the present invention. The layers thus formed are then pixelated. By way of example and without limitation, the layers are removed using known lithographic methods and by etching at the sites that subsequently correspond to the spaces between the elementary light sources 110 on the substrate. A plurality of several tens or hundreds or thousands of pixels 110 having an area smaller than one square millimeter for each individual pixel, and having a total area greater than 2 square millimeters, having semiconductor layers with homogeneous thicknesses, and therefore having homogeneous and high internal series resistances, are thus able to be produced on the substrate of a matrix-array light source 105. Generally speaking, the more the size of each LED pixel decreases, the more its series resistance increases, and the more this pixel is able to be driven by a voltage source. As an alternative, the substrate comprising the epitaxial layers covering at least part of the surface of the substrate is sawn or divided into elementary light sources, each of the elementary light sources having similar characteristics in terms of their internal series resistance.

The invention also relates to types of semiconductor element-based elementary light sources involving other configurations of semiconductor layers. In particular the substrates, the semiconductor materials of the layers, the arrangement of the layers, their thicknesses and any vias between the layers may be different from the example that has just been described.

The illustration in FIG. 2 shows a lighting device 200 comprising a pixelated light source or matrix-array light source 205 according to another preferred embodiment of the invention. The matrix-array light source 205 comprises a plurality of electroluminescent semiconductor element-based elementary light sources 210, of LED type, and a common substrate, not illustrated. Each elementary light source comprises an emitting area extending over 0.14×0.14 mm, or less. When an elementary light source of this size is traversed by an electric current greater than or equal to the intensity of the forward current, it experiences a temperature gradient of the order of 20° C. after a few milliseconds, even one millisecond or less.

The device 200 comprises a circuit for managing the supply of electrical power 230 to two groups of elementary light sources. In the example of FIG. 2, a first the elementary light sources of the first group 210 alternate with the elementary light sources 210' of the second group. The managing circuit comprises, for each elementary light source, a switch device 234, 234' which is controlled by means of a control signal 236, 236', respectively, so as to take an open state or a closed state. The arrangement is such that, when the switch is in the closed state, the corresponding elementary light source is connected to an electricity source, while in the open state, the elementary light source is not connected thereto.

A control unit 232 generates the control signal 236. The signal has a binary appearance, corresponding to the two distinct states that the switch elements 234 may take. It is a pulse-width-modulation (PWM) signal, the frequency of which is higher than or equal to 300 Hz, and preferably higher than or equal to 1 kHz. At this frequency, the phase during which a switch 234 is closed and during which the corresponding elementary light source 210 emits light and heats up is short enough that its semiconductor junction does not heat up by more than 20° C. This prevents damage to the junction.

The control unit 232 also generates the PWM-type control signal 236 intended for the second group of light sources 210'. The signals 236 and 236 are such that the two groups of elementary light sources 210, 210' are not always connected together to the electricity source. For example, the signal 236 may have a duty cycle of 50% and be formed of one half-cycle intended to control the switch devices so that they take their closed state, followed by a second half-cycle intended to control the switch devices so that they take their open state. The signal 236' may then be a copy shifted by a half-cycle of the signal 236, so that the groups of elementary light sources 210, 210' are supplied with electricity in alternation. The signal 236' may in this case be generated on the basis of the signal 236 by means of a delay circuit, known in the prior art. Other embodiments are conceivable without, however, departing from the scope of the invention. The advantage of this arrangement is that the elementary light sources of one group 210 do not always contribute to the heating of the elementary light sources of another group 210', the elementary light sources of which are spatially very close to those of the first group. This arrangement also applies to a larger plurality of groups of elementary sources within the matrix array 205.

In the embodiment of FIG. 2, the circuit for managing the supply of electrical power 230 is housed by an integrated circuit 220, soldered to the lower face of the common substrate, which houses the elementary light sources 210, 210' on its upper face, so as to establish mechanical and electrical contact with the substrate and the elementary light sources.

Using an integrated circuit 120 in mechanical and electrical contact with the substrate on which the elementary light sources reside makes it possible to dispense with wired connections, the number of which would be at least equal to the number of pixels of the matrix-array light source. Since the managing circuit 230 is spatially close to the matrix array 205 of elementary light sources 210, 210', the control times are negligible. Specifically, the components of the circuit 230 are located a few micrometers below the elementary light sources.

Preferably, a power supply circuit may be integrated into the substrate when the monolithic component 205 is manufactured.

According to another embodiment, the shift between the respective on times of the groups of elementary light sources (210, 210' in the case of FIG. 2) is produced by a delay circuit 290/290' integrated beneath each light source. A PWM-type control signal such as just described for other embodiments is used to control the elementary light sources. However, the delay circuits 290/290' of each elementary light source apply the control only after their respective delay has elapsed. The arrangement may preferably be such that the delay circuits 290/290' are functionally connected in a chain, and such that the delay of one elementary light source starts to elapse only once the delay of the preceding elementary light source of the chain has elapsed. In this way, the simultaneous heating of all of the elementary light sources is also reduced. Preferably, each of the delay circuits 290/290' may comprise a memory element 291/291' for recording a delay value. The delay circuit 290/290' may preferably comprise a delay line.

It goes without saying that the integrated circuit may comprise other electronic circuits and/or memory elements used for other functions in connection with the matrix-array light source and/or with the elementary light sources. This includes but is not limited to circuits for detecting a short circuit or an open circuit fault with an elementary light source.

The scope of protection is defined by the claims.

The invention claimed is:

1. A lighting device for a motor vehicle, comprising a matrix-array light source having a matrix array of electroluminescent semiconductor element-based elementary light sources, and a circuit for managing the supply of electrical power to at least one group of elementary light sources, the circuit for managing the supply of electrical power comprising a control unit and, for each elementary light source of the group, a switch element for selectively connecting said elementary light source to an electricity source, the control unit being further intended to control the open state of the switch elements by means of a pulse-width-modulation binary control signal, wherein the emitting area of each of the elementary light sources is smaller than or equal to 0.2 mm$^2$, and in that the control unit is able to transmit a control signal having a frequency higher than or equal to 300 Hz, wherein the matrix-array light source comprises an integrated circuit in contact with the matrix array of light sources, and the integrated circuit comprises at least a portion of the circuit for managing the supply of electrical power to the elementary light sources, the integrated circuit comprises, for each of the elementary light sources of the matrix array of elementary light sources, a delay circuit configured to delay, by a predetermined duration, the supply of power to the elementary source following reception of a command from the control signal, and the delay circuit for each of the elementary light sources of the matrix array of elementary light sources comprises a memory element for recording a delay value.

2. The lighting device as claimed in claim 1, wherein the frequency of the control signal is higher than or equal to 1 kHz.

3. The lighting device as claimed in claim 2, wherein said group of elementary light sources comprises all of the elementary light sources of the matrix array of elementary light sources.

4. The lighting device as claimed in claim 2, wherein the circuit for managing the supply of electrical power is configured to control the open state of the switch elements of at least two groups of elementary light sources of the matrix array of elementary light sources in alternation.

5. The lighting device as claimed in claim 1, wherein said group of elementary light sources comprises all of the elementary light sources of the matrix array of elementary light sources.

6. The lighting device as claimed in claim 1, wherein the circuit for managing the supply of electrical power is configured to control the open state of the switch elements of at least two groups of elementary light sources of the matrix array of elementary light sources in alternation.

7. The lighting device as claimed in claim 1, wherein the delay circuit of each elementary light source is functionally connected to the delay circuit of another elementary light source, the arrangement being such that the delay for the second elementary light source starts only to elapse once the delay of the first elementary light source has elapsed.

8. The lighting device as claimed in claim 1, wherein the delay for each elementary light source is identical.

* * * * *